Patented July 28, 1953

2,647,128

UNITED STATES PATENT OFFICE 2,647,128

PROCESS FOR PREPARING METAL PHTHALOCYANINES

Robert E. Brouillard, Westfield, N. J., assignor to General Aniline & Film Corporation, New York, N. Y., a corporation of Delaware No Drawing. Application November 24, 1950, Serial No. 197,519

10 Claims. (Cl. 260—314.5)

This invention relates to an improvement in the manufacture of metal phthalocyanines.

A procedure extensively used in the commercial production of metal phthalocyanines involves heating together a phthalocyanine-forming metal or metal-yielding compound (a "metal donor"), urea (a "nitrogen donor"), and as an organic phthalocyanine-forming intermediate, an aromatic ortho-dicarboxylic acid anhydride or related compound, in an inert high-boiling organic solvent or diluent, in the presence of a catalyst, especially a molybdate, which promotes formation of a phthalocyanine. Instead of urea, related compounds can be used as nitrogen donors, such as biuret, guanidine, guanidyl-urea, dicyandiamide, or cyanuric acid. Instead of aromatic ortho-dicarboxylic acid anhydrides, the organic phthalocyanine-forming intermediate can be the corresponding free acid, an ester, ammonium salt, mono- or diamide, imide or imidoimidine of the ortho-dicarboxylic acid, corresponding ortho-cyanocarboxylic acid or an ester, ammonium salt or amide thereof, or related ortho-substituted aromatic compounds which yield dicarboxylic acid derivatives under the conditions of the reaction, for example, the corresponding acid halides, $\omega,\omega'$-polychloro- or -polybromo-o-dimethyl aromatic compounds, or $\omega$-polychloro- or -polybromo-o-cyano-methyl aromatic compounds. Such processes are termed herein "urea solvent" processes.

As compared with processes in which no organic solvent is used, the urea solvent process is characterized by a more moderate reaction, and an improvement in the quality of the product. However, at the same time, the presence of a solvent tends to lower the yield. While acceptable yields of some phthalocyanine pigments are obtained in this process, in most cases, the yields are too low to permit satisfactory commercial operations.

For example, upon reacting phthalic anhydride and urea with aluminum chloride in the presence of an organic solvent and ammonium molybdate as a catalyst, aluminum phthalocyanine is produced in amounts corresponding to yields of the order of 10 to 15% of theory based on the amount of phthalic anhydride employed. Magnesium phthalocyanine, when prepared by a similar process using a magnesium compound instead of aluminum chloride, is likewise produced in a poor yield. This procedure is also unsatisfactory for making nickel phthalocyanine. While high yields of copper phthalocyanine are obtained in a process employing cuprous chloride in the aforesaid procedure, tetrachloro-phthalic anhydride and cuprous chloride, reacted with urea under similar conditions, fails to provide a satisfactory yield of copper hexadecachlorophthalocyanine or a sufficiently pure product. It has been necessary, therefore, in commercial practice, to prepare copper hexadecachlorophthalocyanine by chlorination of preformed copper phthalocyanine in a flux such as a fused mixture of aluminum chloride and sodium chloride.

It is an object of this invention to improve the yield and quality of metal phthalocyanines produced in the urea solvent process, especially in those cases in which the yield and quality of the product are otherwise unsatisfactory.

Among the specific objects of my invention is the provision of a urea solvent process for the production of magnesium phthalocyanine, aluminum phthalocyanine, nickel phthalocyanine, and copper hexadecachlorophthalocyanine, wherein high yields are obtained and the product is of high quality.

I have discovered that these objects can be achieved by including in the reaction mixture employed in the urea solvent process for making metal phthalocyanines, a salt of a phosphoric acid (i. e., of an acid of which the formula can be expressed empirically as a combination of $x$ mols of $P_2O_5$ with $y$ mols of $H_2O$, $x$ and $y$ being positive integers) with at least one member selected from the group consisting of the alkali metals, the alkaline earth metals and the ammonium radical in an amount not substantially less than 25%, and preferably up to about 100%, of the weight of the organic phthalocyanine intermediate, i. e., the aromatic ortho-dicarboxylic acid anhydride or equivalent ortho-disubstituted aromatic compound. The aforesaid salts can be acid (i. e., including residual hydrogen atoms) or neutral. They include, for example, orthophosphates, pyrophosphates, meta-phosphates, poly-meta-phosphates (e. g. tri-, tetra- and hexa-meta-phosphates) and polyphosphates of Na, K, $NH_4$, Ca, Ba, Sr, or Mg, e. g. $Na_2HPO_4$, $NaH_2PO_4$, $Na_3PO_4$, $NaPO_3$, $(NH_4)_2HPO_4$, $MgNH_4PO_4$, $Ca_3(PO_4)_2$, $CaHPO_4$, $Ca(H_2PO_4)_2$, $Na_4P_2O_7$, $(NaPO_3)_3$, $(NaPO_3)_6$, $(NaPO_3)_4 \cdot 4H_2O$, and polyphosphates obtained by fusion of alkali metal hexameta-phosphates with alkali metal pyrophosphates. Free ortho-phosphoric acid, however, does not yield advantageous results comparable with those obtained with the aforesaid salts.

For example, I have found that inclusion of monosodium phosphate, trisodium phosphate or diammonium phosphate in a reaction mixture containing urea, phthalic-anhydride, aluminum chloride and a molybdate catalyst in a high-boiling organic solvent, the phosphate amounting to about half the weight of the phthalic anhydride, and heating in the usual manner to form a phthalocyanine, increases the yield of aluminum phthalocyanine from about 12% to about 85% of theory. A similar improvement in yield is obtained in like manner in the preparation of magnesium phthalocyanine and nickel phthalocyanine from phthalic anhydride as well as copper hexadecachlorophthalocyanine from tetrachlorophthalic anhydride in a urea solvent process.

Thus, the improved process of my invention involves heating, at phthalocyanine-forming temperatures (preferably 150 to 210° C.) a reaction mixture containing a phthalocyanine-forming metal-yielding reagent; an organic phthalocyanine intermediate of the class consisting of the aromatic ortho-dicarboxylic acids, their anhydrides, acid halides, esters, ammonium salts, dehydrated, deammoniated or dehydrated-deammoniated derivatives of such ammonium salts lacking up to a total of 3 mols of ammonia and/or of water per molecule, equivalent $\omega,\omega'$-polyhalo-o-dimethyl aromatic compounds and $\omega$-polyhalo-o-cyano-methyl aromatic compounds, in which the ortho-substituents form a tetrazaporphine ring in said reaction mixture; a nitrogen donor of the class consisting of urea, biuret, guanidine, guanidyl-urea, dicyandiamide and cyanuric acid; an inert organic liquid diluent; a catalyst, especially a molybdate catalyst; and a salt of a phosphoric acid with a member selected from the group consisting of alkali metals, alkaline earth metals and the ammonium radical, in an amount not substantially less than 25%, and preferably not substantially more than 100%, of the amount of the aforesaid organic phthalocyanine intermediate.

It has been suggested heretofore to include alkaline-reacting phosphates in a reaction mixture for the preparation of metal phthalocyanines from aromatic ortho-dinitriles in the presence of organic solvents (U. S. Patent 2,276,598), and to include diammonium phosphate in a urea-type fusion for the preparation of metal phthalocyanines in the absence of organic solvents (U. S. Patents 2,213,726 and 2,410,301). The beneficial effect of phosphates in the aromatic dinitrile process is ascribed to their alkaline properties which are non-essential in the urea solvent process of this invention. Thus, in the present process, the effect of the phosphoric acid salts in increasing the yield and quality of phthalocyanine does not depend on the alkaline reaction of the salt since alkali metal dihydrogen phosphates which have an acidic reaction have been found effective to the same extent as tertiary alkali metal phosphates of alkaline reaction. In urea fusion processes of the prior art which were carried out in the absence of an organic solvent, the beneficial effect of the phosphate was scarcely noticeable, as indicated by the results set forth in U. S. Patent 2,410,301, which in no way suggests the phenomenal improvement effected in accordance with the present invention.

The aromatic ortho-disubstituted compounds serving as organic phthalocyanine intermediates for the process of my invention are preferably phthalic anhydride and its nuclear substitution products. Suitable nuclear substituents are, for example, halogen (e. g. chlorine or bromine), nitro, alkyl, aryl, condensed nuclear aryl, alkoxy, aryloxy, alkyl thio, aryl thio, and alkyl or aryl keto groups (i. e., acyl groups). Instead of the anhydride, the corresponding ortho-dicarboxylic acid can be used or an ester or acid halide thereof, a salt (especially an ammonium salt) thereof, mono- or diamides, imides, as well as the corresponding ortho-cyanocarboxy acid, its esters, ammonium salt or amide. In similar manner, corresponding $\omega,\omega'$-polyhalo-o-dimethyl aromatic compounds and $\omega$-polyhalo-o-cyano-methyl aromatic compounds can be used.

Suitable nitrogen donors are those enumerated above.

Catalysts employed in the reaction mixture are of the type disclosed in U. S. Patent 2,214,477, such compounds generally containing an element of group V or VI of the periodic table, having an atomic number from 15 to 92, inclusive, especially molybdates such as alkali metal or ammonium molybdates, phospho-molybdates or tungsto-molybdates. Suitable amounts of such catalysts range from 0.1 to 2% of the weight of the total reaction mixture.

Metal-yielding compounds or "donors" suitable for use in the reaction mixture are those containing metals heretofore employed for forming metal-phthalocyanines — namely, polyvalent metals and their salts such as copper, aluminum, magnesium, nickel, iron, cobalt, zinc, vanadium, and the like. Compounds of these metals adapted for use as metal donors include the halides (chlorides or bromides), sulfates, nitrates and oxides.

While magnesium is a phthalocyanine-forming metal, salts thereof with phosphoric acids can be used in reaction mixtures for preparation of acid-stable phthalocyanines of other metals in accordance with this invention, since magnesium, if it enters the phthalocyanine molecule at all, is displaced by the other metal of a metal donor, such as Al, Cu, Ni, Fe or the like, which forms acid-stable phthalocyanines. When a magnesium salt of a phosphoric acid is used in accordance with this invention in a reaction mixture for preparation of magnesium phthalocyanine, another magnesium compound, such as magnesium oxide, is preferably employed as the metal donor. However, if the phosphoric acid magnesium salt also serves as the metal donor, the amount thereof required to form the phthalocyanine is not included in calculating the amount serving as an improving agent in accordance with this invention. Accordingly, the amount of phosphoric acid magnesium salt in such a reaction mixture exceeds the amount required as a metal donor by an amount equal to at least 25% of the weight of the organic phthalocyanine intermediate.

Solvents suitable for the reaction are inert organic solvents having a sufficiently high boiling point to remain liquid under the conditions of the reaction. They include, for example, trichlorobenzene, dichlorobenzene, naphthalene and its chlorinated derivatives, quinoline, benzophenone, nitrobenzene, and the like.

Processes according to my invention are illustrated by the following examples, wherein parts are by weight.

Example 1

10.5 parts of phthalic anhydride, 12.5 parts of urea, 0.25 part of ammonium molybdate, and 5.4 parts of monosodium dihydrogen phosphate are slurried in 35 parts of trichlorobenzene. A slurry of 3 parts of anhydrous aluminum chloride in 5 parts of trichlorobenzene are added, and the mixture is agitated and heated gradually under reflux to 200 to 205° C. over a period of 6 hours. A slurry of 5.4 parts of urea in 10 parts of trichlorobenzene are then added, and the temperature maintained at 200 to 205° C. for 5 hours. Chloroaluminum phthalocyanine produced in the resulting reaction is recovered by filtration of the reaction mixture after cooling, the filter cake being washed with trichlorobenzene and water, and dried. A yield of 85% of theory of chloroaluminum phthalocyanine is obtained in substantially pure form.

Similar results are obtained by substituting an equal amount of disodium hydrogen phosphate or trisodium phosphate for the monosodium phosphate of this example. In like manner, calcium phosphate, magnesium pyrophosphate or magnesium ammonium phosphate can be substituted in similar amount for the monosodium phosphate of this example. Calcium and magnesium salts can be removed from the product by extraction with aqueous hydrochloric acid. If a magnesium phosphate is used, chloroaluminum phthalocyanine is formed despite the fact that magnesium is also a phthalocyanine-forming metal, magnesium being replaceable by hydrogen and by acid-stable phthalocyanine-forming metals, while aluminum forms an acid-stable phthalocyanine and is not replaceable by hydrogen or other metals.

Example 2

116.2 parts of phthalamide, 126 parts of urea, 30 parts of aluminum chloride, 2.5 parts of ammonium molybdate and 54 parts of diammonium phosphate are slurried in 400 parts of tetrachlorobenzene, and the mixture heated at 200 to 205° C. for 1 hour. A slurry of 54 parts of urea in 100 parts of trichlorobenzene is added to the mixture and the latter agitated at 200 to 205° C. for 5 additional hours. The mixture is filtered, the filter cake washed with trichlorobenzene, and dried. Chloroaluminum phthalocyanine is formed in a yield of the same order as in the first example, and can be purified by extraction with aqueous caustic soda.

Instead of phthalamide, 104.2 parts of phthalimide or 103.7 parts of o-cyanobenzamide can be used to obtain similar results.

Example 3

20 parts of tetrachlorophthalic anhydride, 13 parts of urea, 0.25 part of ammonium molybdate, 3 parts of cuprous chloride and 5 parts of disodium hydrogen phosphate are slurried in 50 parts of trichlorobenzene, and the mixture heated at 200 to 205° C. for 5 hours. On filtering the mixture, washing the filter cake with trichlorobenzene, evaporating the solvent from the pigment, drying and extracting with water, a good yield of a brilliant green copper hexadecachlorophthalocyanine is obtained.

Similar results are produced upon substituting for the disodium phosphate of this example, a similar amount of trisodium phosphate or monosodium phosphate.

Example 4

10.5 parts of phthalic anhydride, 12.6 parts of urea, 2.96 parts of anhydrous nickel chloride, 0.25 part of ammonium molybdate and 5.4 parts of trisodium phosphate are slurried with 40 parts of trichlorobenzene and the mixture heated at 200° C. for 1 hour. 5.4 parts of urea in the form of a slurry in 10 parts of trichlorobenzene are then added to the mixture, and the latter heated at 200° C. for 4 hours. The mixture is then filtered and dried, slurried with hot aqueous alkali, filtered and washed with water, whereby nickel phthalocyanine in good yield and high quality is obtained.

Similar results are obtained by employing an equal amount of monosodium dihydrogen phosphate or sodium tripolyphosphate ($Na_5P_3O_{10}$) instead of the trisodium phosphate of this example.

Example 5

10.5 parts of phthalic anhydride, 12.6 parts of urea, 0.91 part of magnesium oxide, 0.25 part of ammonium molybdate and 5.4 parts of sodium tripolyphosphate are slurried with 40 parts of trichlorobenzene and the mixture heated with agitation at 200° C. for 4 hours. The reaction mixture is then filtered, the trichlorobenzene removed by evaporation from the filter cake, and the latter slurried with hot aqueous alkali. The slurry is filtered hot, and the filter cake washed with water until neutral, whereby a high yield of bright blue magnesium phthalocyanine is obtained.

The same product is obtained in this example by substituting for the sodium tripolyphosphate a similar amount of sodium meta-phosphate or magnesium phosphate.

In the foregoing examples, neutral as well as acid salts of phosphoric acids with the alkali metals (Na or K), ammonium ($NH_4$) or alkaline earth metals (Ca, Ba, Sr, Mg) as indicated in the examples and enumerated in the preceding disclosure, can be substituted for the salts employed as promoters for the reaction.

Instead of urea, there can be used biuret, guanidine, guanidyl-urea, dicyandiamide or cyanuric acid. Ammonium molybdate can be replaced by alkali metal molybdates, phosphomolybdates or tungstomolybdates. Other compounds having similar catalytic action can be similarly used.

Convenient metal donors are those disclosed in the examples. Metallic copper or other copper salts can be used instead of cuprous chloride; aluminum acetate can replace aluminum chloride; magnesium nitrate or chloride can replace magnesium oxide; and nickel nitrate can replace nickel chloride. Salts of cobalt, metallic zinc or its salts, iron or iron salts as well as compounds of tin, vanadium, or chromium can be substituted for the metal compounds of the examples to prepare the corresponding metal phthalocyanines.

Instead of the o-dicarboxy anhydrides or amides of the examples, there can be employed as aromatic ortho-substituted phthalocyanine-forming intermediates; the corresponding free acids, the ammonium salts and esters, mono- or diamide or imide, esters or ammonium salt of the corresponding monoamide, as well as the corresponding o-cyanobenzoic acid, its ammonium salt, ester or amide. Other suitable intermediates are the corresponding o-dicarboxylic acid chlorides, e. g. phthalyl chloride, and compounds which react in similar manner under the reaction conditions, for example, $\omega,\omega'$-polychloro- or -polybromo-o-dimethyl aromatic compounds (e. g. ω-tetra-, -penta-, or -hexachloro-o-xylene); or ω-chloro- or -bromo-o-methyl aromatic nitriles (e. g. ω-mono-, -di- or -tri-o-tolunitrile).

The aforesaid aromatic intermediates are preferably of the benzene series and can contain additional nuclear substituents which are non-reactive under the reaction conditions, e. g. chlorine, bromine, nitro, alkoxy, aryloxy, alkyl-thio or aryl-thio radicals, alkyl or aryl hydrocarbon radicals.

Trichlorobenzene, employed as a diluent in the examples, can be replaced by other inert organic solvents such as nitrobenzene, dichlorobenzene, benzophenone, naphthalene, chlorinated naphthalenes, quinoline and the like, which have a sufficiently high boiling point to permit operations in the liquid phase at reaction temperature. If desired, superatmospheric pressure can be used to maintain the solvent in liquid form during the reaction.

Suitable amounts of the phosphoric acid salts employed as promoters in accordance with this invention are at least 25% of the weight of the aromatic phthalocyanine-forming intermediate (e. g. of the amount of phthalic anhydride). Amounts substantially exceeding the weight of the phthalocyanine-forming intermediate produce no substantial improvement in yield or quality and are preferably not employed. The proportions in the examples wherein the amount is approximately one-half to two-thirds the amount of the organic intermediate are generally preferred.

Suitable proportions for the remaining ingredients of the reaction mixture are illustrated in the examples. Thus, the amount of trichlorobenzene may be about 4 to 5 times the amount of aromatic phthalocyanine-forming intermediate. An equivalent amount of other inert solvents can be used instead. The amount of urea is preferably 2½ to 5 mols per mol of the aromatic phthalocyanine-forming intermediate. The proportion of metal-yielding compound is somewhat in excess (e. g. an excess of 10 to 30%) of the amount theoretically required to form a metal phthalocyanine with the intermediate employed. Thus, in the examples, at least 0.28 to 0.32 mol of metal compound (containing one atom of metal) is employed per molecule of phthalic anhydride or derivative thereof, the amount of metal compound theoretically required being 0.25 mol per mol of the phthalic anhydride. Ammonium molybdate, or similar catalysts, are advantageously employed in an amount corresponding to 0.1 to 0.5% of the weight of the total reaction mixture. Amounts up to 2% can be used but are, in general, not required.

The reaction temperature can be varied over a considerable range, depending upon the specific reagents employed. Suitable temperatures generally lie within the range of 150 to 210° C. Satisfactory results can be obtained in most cases by maintaining a temperature of about 200° C. for 4 to 5 hours.

The pigments produced can be readily isolated from the reaction mixture by filtration, removal of the organic solvent, and aqueous extraction, including in appropriate cases an acid or an alkaline-reacting material.

Variations and modifications which will be obvious to those skilled in the art can be made in the procedures hereinbefore described, without departing from the scope or spirit of this invention.

I claim:
1. In a process for preparing a metal phthalocyanine, which comprises heating, at phthalocyanine-forming temperature, a reaction mixture containing an organic phthalocyanine intermediate of the class consisting of carbocyclic aromatic ortho-dicarboxylic acids, their anhydrides, acid halides, esters, ammonium salts, mono- and diamides, imides and iminoimidines, the corresponding ortho-cyanocarboxylic acids and their esters, amides and ammonium salts, and corresponding ω,ω'-polyhalo-o-dimethyl and ω-polyhalo-o-cyanomethyl carbocyclic aromatic compounds; a nitrogen donor of the class consisting of urea, biuret, guanidine, guanidyl-urea, dicyandiamide and cyanuric acid, and a phthalocyanine-forming metal-yielding reagent, in the presence of a catalyst promoting phthalocyanine formation in an inert organic liquid diluent, the improvement which comprises including in said reaction mixture an amount not substantially less than 25% of the weight of the said organic phthalocyanine intermediate, of a phosphoric acid salt of a member of the group consisting of the alkali metals, alkaline earth metals, and ammonium radical.

2. In a process for preparing a metal phthalocyanine, which comprises heating, at a temperature of 150 to 210° C., a reaction mixture containing an organic phthalocyanine intermediate of the class consisting of carbocyclic aromatic ortho-dicarboxylic acids, their anhydrides, acid halides, esters, ammonium salts, mono- and diamides, imides and iminoimidines, the corresponding ortho-cyano-carboxylic acids and their esters, amides and ammonium salts, and corresponding ω,ω'-polyhalo-o-dimethyl and ω-polyhalo-o-cyanomethyl carbocyclic aromatic compounds; a nitrogen donor of the class consisting of urea, biuret, guanidine, guanidyl-urea, dicyandiamide and cyanuric acid, and a phthalocyanine-forming metal-yielding reagent, in the presence of a molybdate catalyst in an inert organic liquid diluent, the improvement which comprises including in said reaction mixture an amount not substantially less than 25%, and not substantially exceeding 100%, of the weight of the said organic phthalocyanine intermediate, of a phosphoric acid salt of a member of the group consisting of the alkali metals, alkaline earth metals, and ammonium radical.

3. A process as defined in claim 2, wherein said metal-yielding reagent is an aluminum salt.

4. A process as defined in claim 2, wherein said metal-yielding reagent is a nickel salt.

5. A process as defined in claim 2, wherein said metal-yielding reagent is a magnesium compound.

6. A process as defined in claim 2, wherein said organic phthalocyanine intermediate is tetrachlorophthalic anhydride and said metal-yielding reagent is a copper salt.

7. A process for preparing chloroaluminum phthalocyanine, which comprises heating, at a temperature of about 200° C., a reaction mixture containing aluminum chloride, phthalic anhydride, urea, and a molybdate catalyst in an inert organic diluent together with an alkali metal salt of a phosphoric acid amounting to 25 to 100% of the weight of phthalic anhydride.

8. A process for preparing nickel phthalocyanine, which comprises heating, at a temperature of about 200° C., a reaction mixture containing nickel chloride, phthalic anhydride, urea, and a molybdate catalyst in an inert organic diluent together with an alkali metal salt of a phosphoric acid amounting to 25 to 100% of the weight of phthalic anhydride.

9. A process for preparing magnesium phthalocyanine, which comprises heating, at a temperature of about 200° C., a reaction mixture containing magnesium oxide, phthalic anhydride, urea, and a molybdate catalyst in an inert organic diluent together with an alkali metal salt of a phosphoric acid amounting to 25 to 100% of the weight of phthalic anhydride.

10. A process for preparing copper hexadecachlorophthalocyanine, which comprises heating, at a temperature of about 200° C., a reaction mixture containing cuprous chloride, tetrachlorophthalic anhydride, urea, and a molybdate catalyst in an inert organic diluent, together with an alkali metal salt of a phosphoric acid amounting to 25 to 100% of the weight of said tetrachlorophthalic anhydride.

ROBERT E. BROUILLARD.

References Cited in the file of this patent

FOREIGN PATENTS

| Number | Country | Date |
|---|---|---|
| 476,243 | Great Britain | Dec. 6, 1937 |
| 525,237 | Great Britain | Aug. 23, 1940 |